United States Patent
Maguin

(10) Patent No.: US 10,018,090 B2
(45) Date of Patent: Jul. 10, 2018

(54) FILTER CARTRIDGE FOR A REDUCING AGENT DELIVERY DEVICE AND DELIVERY DEVICE AND MOTOR VEHICLE HAVING A FILTER CARTRIDGE

(71) Applicant: EMITEC GESELLSCHAFT FÜR EMISSIONSTECHNOLOGIE MBH, Lohmar (DE)

(72) Inventor: Georges Maguin, Marly (FR)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 73 days.

(21) Appl. No.: 14/461,592

(22) Filed: Aug. 18, 2014

(65) Prior Publication Data

US 2014/0352284 A1  Dec. 4, 2014

Related U.S. Application Data

(63) Continuation of application No. PCT/EP2013/053090, filed on Feb. 15, 2013.

(30) Foreign Application Priority Data

Feb. 16, 2012 (DE) .................... 10 2012 003 121

(51) Int. Cl.
| | |
|---|---|
| *F01N 3/00* | (2006.01) |
| *F01N 3/20* | (2006.01) |
| *B01D 35/14* | (2006.01) |
| *B01D 29/11* | (2006.01) |

(Continued)

(52) U.S. Cl.
CPC .......... *F01N 3/2066* (2013.01); *B01D 29/114* (2013.01); *B01D 29/21* (2013.01); *B01D 35/14* (2013.01); *F01N 3/2882* (2013.01); *B01D 2201/02* (2013.01); *B01D 2201/20* (2013.01); *B01D 2201/291* (2013.01);
(Continued)

(58) Field of Classification Search
CPC ... F01N 3/2066; B01D 2201/20; B01D 35/14; B01D 29/114
See application file for complete search history.

(56) References Cited

U.S. PATENT DOCUMENTS

| | | | |
|---|---|---|---|
| 4,329,226 A * | 5/1982 | Thompson ......... | B01D 17/0202 210/180 |
| 4,529,512 A | 7/1985 | Williamson et al. | |
| 6,247,486 B1 * | 6/2001 | Schwegler ............ | B01D 29/21 123/510 |
| 7,481,319 B2 | 1/2009 | Jokschas et al. | |

(Continued)

FOREIGN PATENT DOCUMENTS

| | | |
|---|---|---|
| CN | 2072859 U | 3/1991 |
| CN | 101959569 A | 1/2011 |

(Continued)

*Primary Examiner* — Mark Laurenzi
*Assistant Examiner* — Jason Sheppard
(74) *Attorney, Agent, or Firm* — Laurence A. Greenberg; Werner H. Stemer; Ralph E. Locher

(57) ABSTRACT

A filter cartridge for a delivery device for a reducing agent includes at least one filter wall and at least one supporting wall together forming an interior space. The at least one supporting wall has an outflow opening and a bypass opening. The outflow opening can be coupled to the delivery device and the bypass opening bypasses the filter wall. A delivery device and a motor vehicle having a filter cartridge are also provided.

14 Claims, 3 Drawing Sheets

(51) Int. Cl.
 *B01D 29/21* (2006.01)
 *F01N 3/28* (2006.01)
(52) U.S. Cl.
 CPC .. *B01D 2201/4084* (2013.01); *F01N 2260/26* (2013.01); *F01N 2610/02* (2013.01)

(56) References Cited

U.S. PATENT DOCUMENTS

| | | | |
|---|---|---|---|
| 8,425,769 B2 * | 4/2013 | Gift | B01D 27/103 |
| | | | 210/130 |
| 8,875,502 B2 | 11/2014 | Fuchs et al. | |
| 2001/0010297 A1 * | 8/2001 | Pulek | B01D 29/111 |
| | | | 210/493.2 |
| 2003/0209482 A1 | 11/2003 | Klotz et al. | |
| 2009/0101656 A1 * | 4/2009 | Leonard | B01D 53/9431 |
| | | | 220/562 |
| 2009/0218295 A1 | 9/2009 | Verdegan et al. | |
| 2012/0312733 A1 | 12/2012 | Elayed et al. | |
| 2013/0126416 A1 | 5/2013 | Weindorf et al. | |
| 2013/0319550 A1 | 12/2013 | Maguin et al. | |

FOREIGN PATENT DOCUMENTS

| | | | |
|---|---|---|---|
| DE | 10340123 A1 | 3/2005 |
| DE | 102010054349 A1 | 6/2011 |
| DE | 102011010640 A1 | 8/2012 |
| JP | 2009125737 A | 6/2009 |
| JP | 2010007617 A | 1/2010 |
| JP | 2012127351 A | 7/2012 |
| WO | 2011060254 A1 | 5/2011 |
| WO | 2012007337 A1 | 1/2012 |

\* cited by examiner

FILTER CARTRIDGE FOR A REDUCING AGENT DELIVERY DEVICE AND DELIVERY DEVICE AND MOTOR VEHICLE HAVING A FILTER CARTRIDGE

CROSS-REFERENCE TO RELATED APPLICATION

This is a continuation, under 35 U.S.C. § 120, of copending International Application No. PCT/EP2013/053090, filed Feb. 15, 2013, which designated the United States; this application also claims the priority, under 35 U.S.C. § 119, of German Patent Application DE 10 2012 003 121.1, filed Feb. 16, 2012; the prior applications are herewith incorporated by reference in their entirety.

BACKGROUND OF THE INVENTION

Field of the Invention

The invention relates to a filter cartridge for a reducing agent delivery device. The invention also relates to a delivery device for a reducing agent and a motor vehicle having a filter cartridge.

Exhaust-gas treatment devices into which a reducing agent is supplied are used, inter alia, for the purification of the exhaust gases of internal combustion engines. In such exhaust-gas treatment devices, certain pollutants in the exhaust gas can be reduced in a particularly effective manner by using the reducing agent. So-called SCR catalytic converters in which nitrogen oxide compounds in the exhaust gas are converted with the aid of ammonia are particularly frequently used there. Ammonia is generally not stored directly in motor vehicles but rather in liquid form, which is also referred to as a reducing agent precursor solution. A widely used reducing agent precursor solution is urea-water solution, available for example under the trademark AdBlue® with a urea content of 32.5%. The reducing agent precursor solution may be converted into the actual reducing agent in the exhaust-gas treatment device and/or in an exhaust-gas-external generator. The expression "reducing agent" will hereinafter also be used to mean reducing agent precursor solutions and the like.

A suitable delivery device which is generally provided in motor vehicles for the delivery of the reducing agent into the exhaust-gas treatment device, delivers the reducing agent from a tank. In constructing delivery devices of that type, it is a problem that the reducing agent may have impurities, and the delivery device should therefore include a device for filtering the reducing agent. That is achieved, for example, by using exchangeable filter cartridges which are provided in the delivery device. It is also a problem that aqueous reducing agents can freeze. The reducing agent AdBlue® freezes, for example, at −11° C. Such low temperatures may arise, in particular, during relatively long standstill phases of an internal combustion engine. An increase in volume therefore takes place when freezing occurs. If only a limited space is available for the increase in volume, the increase in volume results in a drastic pressure increase. That is referred to as so-called ice pressure. A delivery device for reducing agent must therefore be constructed or operated in such a way that it is not damaged by the freezing of the reducing agent or by the described increase in volume and the ice pressure. That has proven to be a problem, in particular, in the region of the filter in a delivery device.

SUMMARY OF THE INVENTION

It is accordingly an object of the invention to provide a filter cartridge for a reducing agent delivery device and a delivery device and a motor vehicle having a filter cartridge, which overcome the hereinafore-mentioned disadvantages and solve the highlighted technical problems of the heretofore-known devices and vehicles of this general type to the greatest possible extent. It is sought, in particular, to specify a filter cartridge which is particularly well protected against damage in the event of freezing of a reducing agent tank in a delivery device. Furthermore, it is sought to propose a delivery device which is likewise particularly well adapted to the changed conditions in the interior during and after the freezing of the reducing agent.

With the foregoing and other objects in view there is provided, in accordance with the invention, a filter cartridge for a delivery device for a reducing agent, comprising at least one filter wall and at least one supporting wall which, together with the filter wall, forms an interior space, the at least one supporting wall has an outflow opening and a bypass opening, the outflow opening can be coupled to the delivery device and the bypass opening forms a bypass which bypasses the filter wall.

A filter cartridge has at least one filter wall and at least one supporting wall. The medium to be filtered (liquid reducing agent) passes through the filter wall and, for this purpose, the filter wall has small openings or pores. Filter walls also preferably have a surface area as large as possible and a wall thickness as small as possible in order to ensure as low as possible a flow resistance through the filter wall for the medium to be filtered. The filtering action of a filter wall is determined by the opening size or the pore size of the filter wall. The filter wall is constructed to retain particles in the medium to be filtered which are larger than the opening size or the pore size. The opening size or the pore size is preferably substantially uniform over the entire filter wall in order to obtain a uniform filter action over the entire surface.

Due to the flow resistance through the filter wall a pressure difference is formed between the interior space of the filter cartridge and an outer space which surrounds the filter cartridge during regular operation of the delivery device. This pressure difference moves the reducing agent through the filter wall during operation and it is determined by the flow resistance of the filter wall and the volume flow rate of reducing agent through the filter wall. This pressure difference is typically small during regular operation in relation to ice pressure (occurring in the case of freezing), for example it is smaller than 0.1 bar. During operation, reducing agent is suctioned from the outer space into the interior space of a filter cartridge. The pressure in the interior space is therefore usually lower than the pressure at the outer space during operation. If the delivery device is out of operation or during an interruption of delivery in which no reducing agent is conveyed, there (virtually) does not exist a volume flow rate of reducing agent through the filter wall. Therefore, there does not exist a pressure difference between the interior space and an outer space of the filter cartridge at those times.

The filter wall alone is often not capable of imparting adequate mechanical stability to the filter cartridge. Due to its large surface area and its small wall thickness, the mechanical stability of the filter wall is typically low. The filter cartridge is therefore formed with at least one supporting wall which can permanently predefine the position of the filter wall and which, for example, (partially or completely) encloses and/or (partially or completely) borders the filter wall. The supporting wall, for example, predefines a cartridge shape of the filter cartridge in which the at least one wall fits so that the supporting wall borders the filter wall. Supporting walls cannot be penetrated by the medium to be filtered and have a wall thickness and strength sufficient to maintain the shape of the filter cartridge or to define the shape and position of the filter wall of the filter cartridge. Supporting walls are produced preferably from plastic. A filter cartridge furthermore has, in the region of a supporting wall, (at least) one outflow opening with which the filter cartridge can be coupled to a delivery device.

In this case, the filter cartridge forms an interior space which is delimited, in particular, only by the supporting walls and filter walls. In this case, the interior space forms, in particular, a reservoir for already filtered reducing agent, which can be extracted through the outflow opening of the one supporting wall, and supplied to the delivery device, as required. In this case, it is preferable for the large side surfaces of the side walls/filter walls to substantially predefine the interior space, and for the small edges of the side walls/filter walls to realize the connection to one another. A filter cartridge in a delivery device for reducing agent therefore preferably forms a type of hollow body which delimits an interior space and which is surrounded from an outer side. The reducing agent may, for example, be suctioned from the outside through the filter wall into the interior space formed by the filter cartridge. In the event of freezing, the reducing agent remaining in a filter cartridge usually then freezes proceeding from the filter wall in the direction of the center of the hollow body, or in the direction of the center of the interior space of the filter cartridge. Since the center of the filter cartridge freezes last, a particularly high ice pressure is generally formed in the filter cartridge.

The invention discussed herein is now based on the concept of providing, in a supporting wall of a filter cartridge, (at least) one bypass opening in such a way that (already filtered) reducing agent can flow back out of the interior space of the filter cartridge again to an outer side of the filter cartridge, where in particular still unfiltered reducing agent is present. In this case, the bypass opening is preferably always open, in such a way that at all times, reducing agent can escape out of the interior space again when a predefined excess pressure prevails in the interior space. A bypass opening past the filter wall serves, in particular, the purpose of permitting an "emergency discharge" of reducing agent in the event of an undesirably high pressure being generated in the interior space, in particular in the event of freezing. In the event of freezing, a bypass opening of this type makes it possible, for example, for ice pressure generated in the filter cartridge to be dissipated out of the interior space of the filter cartridge. If the freezing of the filtered reducing agent in the interior space begins at the outside and continues in the inward direction, a type of ice jacket is formed which encloses within it an ever decreasing (still liquid) reducing agent volume. The bypass opening is now disposed, in particular, centrally in such a way that, in the event of freezing, it is in contact with the residual (still liquid) reducing agent volume and ultimately ensures a discharge out of the ice jacket to the outside and thereby prevents a dangerously high pressure rise.

The bypass opening is a highly cost-effective solution for discharging the pressure from the interior space, because no (flexible and/or preloaded) compensation device or the like for discharging the ice pressure is required on the filter cartridge. The bypass opening may be formed in a highly cost-effective manner by using a simple bore. In particular, it is advantageous for only a single bypass opening to be provided. It should also be noted that a bypass flow of the reducing agent during normal operation is negligibly small, in particular because the filter wall has an adequately low flow resistance. The flow resistance is particularly low if the surface of the filter wall is particularly large and the thickness of the filter wall is particularly small. Furthermore, if appropriate, similar materials (for example a sponge, a grid, a sieve, etc.) may also be positioned on the bypass opening at the outside, which materials constitute a flow resistance and thereby limit or almost prevent the bypass flow during normal operation.

A coupling device is also particularly advantageously provided in the region of the outflow opening of the filter cartridge, through the use of which coupling device the outflow opening can be coupled in a fluid-tight manner to a counterpart, provided correspondingly for that purpose, on an opposite opening on the delivery device. A coupling device may, for example, be constructed as a click-type connection or a screw connection. In a particularly advantageous structural variant, the coupling device is constructed to be releasable with respect to the delivery device, in such a way that the filter cartridge can be released from the delivery device without thereby being damaged. The filter cartridge is advantageously also exchangeable, in such a way that a plurality of filter cartridges may be used in the delivery device over the service life of a delivery device.

In accordance with another advantageous feature of the filter cartridge of the invention, the bypass opening has a second diameter which amounts to less than one tenth ($1/10$) of a first diameter of the outflow opening. The bypass opening is therefore considerably smaller than the outflow opening. The bypass opening preferably has a cross-sectional area which amounts to less than one hundredth ($1/100$) of the cross-sectional area of the outflow opening. The bypass opening is constructed to be so small in relation to the outflow opening that, for example, the bypass flow is relatively small but adequate for the desired pressure reduction in the event of freezing.

In accordance with a further advantageous feature of the filter cartridge of the invention, the bypass opening is covered by a screen element. In other words, this means in particular that precisely one screen element is located on the outside of the filter cartridge so as to span the bypass opening. By using a screen element, it is firstly possible for the bypass opening to be protected. Secondly, it is possible by using a screen element for a certain degree of shielding against impurities in the reducing agent to also be obtained in the region of the bypass opening. In this case, it is preferable for the passages in the screen element to be several times larger than the (largest) openings/pores in the filter wall.

In accordance with an added advantageous feature of the filter cartridge of the invention, the screen element is welded or vulcanized to the supporting wall. The technical process of "vulcanization" is known in the art. "Vulcanization" shall, in particular, mean that the screen element and/or a fastening tool (bonding tape, etc.) are at least partially (materially) integrated in the supporting wall, e.g. by using a rubber material which is treated at elevated pressure and elevated temperature for a given period of time, wherein the rubber material especially solidifies (possibly also shrinks) and a durable connection (for example similar to an adhesive bond) of screen element and supporting wall is formed. It is also possible that the screen element is glued or clamped to the supporting wall. The screen element may, for example, be produced from plastic. A screen element of that type composed of plastic can be fastened to the supporting wall in a highly cost-effective manner by using a welding process, in particular if the supporting wall is likewise composed of plastic, because generally only very low technical expenditure, and in particular only very low welding temperatures, are required for the welding of plastic.

It is furthermore advantageous if the bypass opening has a second diameter which amounts to at least 100 μm [micrometers], preferably even at least 200 μm [micrometers] and particularly preferably at least 500 μm [micrometers]. Reducing agent in delivery devices normally freezes when the delivery device is at a standstill, when no vibrations act on the delivery device. It may therefore happen that the reducing agent present in the delivery device cools down in liquid form to below the freezing point of the reducing agent, and then abruptly or suddenly freezes in the event of light agitation. For this reason, the pressure generated during freezing, and the increase in volume generated during freezing, arise relatively quickly. It is therefore necessary for the bypass opening to have a diameter suitable for rapidly dissipating the ice pressure arising during freezing. A minimum diameter in the specified range for the bypass opening is therefore highly advantageous for reducing the forces generated in this case. Furthermore, the minimum diameter should be chosen in such a manner that the bypass opening cannot be blocked by frozen reducing agent.

In accordance with an additional feature of the filter cartridge of the invention, the filter walls form a (substantially) cylindrical basic shape. Furthermore, a top side and a bottom side are formed in each case by a supporting wall, wherein the outflow opening is disposed on the top side and the bypass opening is disposed on the bottom side. The top side and the bottom side are often disposed perpendicular to an axis of symmetry of the cylindrical basic shape. The terms "top side" and "bottom side" do not define any mandatory mounting orientation of the filter cartridge in the delivery device, but these terms explain the spatial configuration of the individual wall sections of the filter cartridge relative to each other. It is possible for the filter cartridge to be mounted in a delivery device with any orientation of the axis of symmetry (for example horizontally, vertically or obliquely). A filter cartridge constructed in this way often freezes from the circumferential surface inwards, in such a way that an inner region of ever decreasing size with liquid reducing agent is formed in a cylindrically shaped ice jacket. In that region, the pressure increases ever further due to the increase in volume of reducing agent as it freezes. That pressure cannot be released in the direction of the outflow opening because the latter is connected to the delivery device. In the delivery device, too, there is normally only a limited volume into which the increasing pressure could be dissipated. Furthermore, the delivery device often has valves or the like provided within it, which prevent a transmission of the ice pressure and the increase in volume into the delivery device. In addition, the delivery device may already be blocked by frozen reducing agent if the ice pressure rises in the filter cartridge. It is therefore advantageous for the bypass opening to be provided on the opposite bottom side of the filter cartridge. The bypass opening is often directed towards a relatively large volume filled with (unfiltered) reducing agent, for example it is often formed at a distance from the base of the filter housing and/or in contact with a compensation element. Such compensation elements may, for example, be compressible inserts composed of rubber (in the form of a sponge) or similar materials. It is also possible for a type of compressible bellows to be provided there, which may, for example, be filled with air. The pressure transmitted through the bypass opening can therefore be dissipated into the external space.

The upper supporting wall and the lower supporting wall may be connected to one another through the interior space of the filter cartridge by using at least one connecting structure or with at least one supporting structure. The supporting structure may be formed, for example, in the manner of a basket which has openings through which the reducing agent can pass (in such a way that there is no relevant flow hindrance in this case) and which at the same time supports the filter wall from the inside or from the direction of the interior space.

In accordance with yet another advantageous feature of the filter cartridge of the invention, the supporting wall has a receptacle in which a compressible insert is disposed. The receptacle and the compressible insert are preferably provided on the outside of the filter cartridge. The receptacle and the compressible insert are preferably provided on the filter cartridge at the point where a bypass opening is also situated. It is also particularly advantageous for the bypass opening, the receptacle and the compressible insert to be provided on the bottom side of a cylindrically shaped filter cartridge. The bottom side is generally situated opposite the top side, on which an outflow opening and if appropriate a coupling device, are situated. Ice pressure building up in the interior of the filter cartridge can thereby be dissipated through the bypass opening to the outside and into the compressible insert. In this case, the receptacle and the compressible insert generally do not seal off the bypass opening. A reducing agent flow (bypass flow) through the bypass opening and, for example, past the compressible insert to an outer side of the filter cartridge therefore remains possible. The insert preferably lies loosely in/on the receptacle.

With the objects of the invention in view, there is also provided a delivery device for a reducing agent, comprising a suction point, a discharge point, and a delivery path for the reducing agent formed from the suction point to the discharge point, the delivery path running at least through a filter cartridge as described according to the invention.

The filter cartridge or the filter wall of the filter cartridge therefore divides the delivery path, in particular, into a first path section from the suction point to the filter wall and a second path section from the filter wall to the discharge point. A pump and (various) valves which are provided for the delivery of the reducing agent in the delivery device are situated preferably in the second path section, in such a way that they are protected against impurities in the reducing agent by the filter cartridge or by the filter wall. From this point of view, the interior space of the filter cartridge is assigned to the second path section, in such a way that practically only filtered reducing agent is present in the second path section. The exterior space around the filter cartridge or around the filter wall is assigned to the first path section. The bypass opening forms a bypass from the second path section to the first path section without the need for flow to pass through the filter wall. The filter wall can therefore be bypassed by using the bypass opening. Pressure which occurs in the interior space of the filter cartridge or in the second path section can be dissipated through the bypass opening into the exterior space around the filter cartridge, or into the first path section.

In this connection, it is not necessary for the filter cartridge to be detachable from the delivery device. It is also possible for the filter cartridge to be an integral constituent part of the delivery device and/or to be fixedly, in particular non-detachably connected to further components of the delivery device. The filter cartridge may, for example, be welded, soldered, brazed or stamped into the delivery device.

With the objects of the invention in view, there is concomitantly provided a motor vehicle, comprising an internal combustion engine, an exhaust-gas treatment device for the purification of the exhaust gases of the internal combustion engine, and a delivery device according to the invention for delivering reducing agent into the exhaust-gas treatment device. A motor vehicle of this type, in particular, also has a tank for liquid reducing agent (for example urea water solution), out of which tank the delivery device can deliver the reducing agent.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being highlighted.

Although the invention is illustrated and described herein as embodied in a filter cartridge for a reducing agent delivery device and a delivery device and a motor vehicle having a filter cartridge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2:
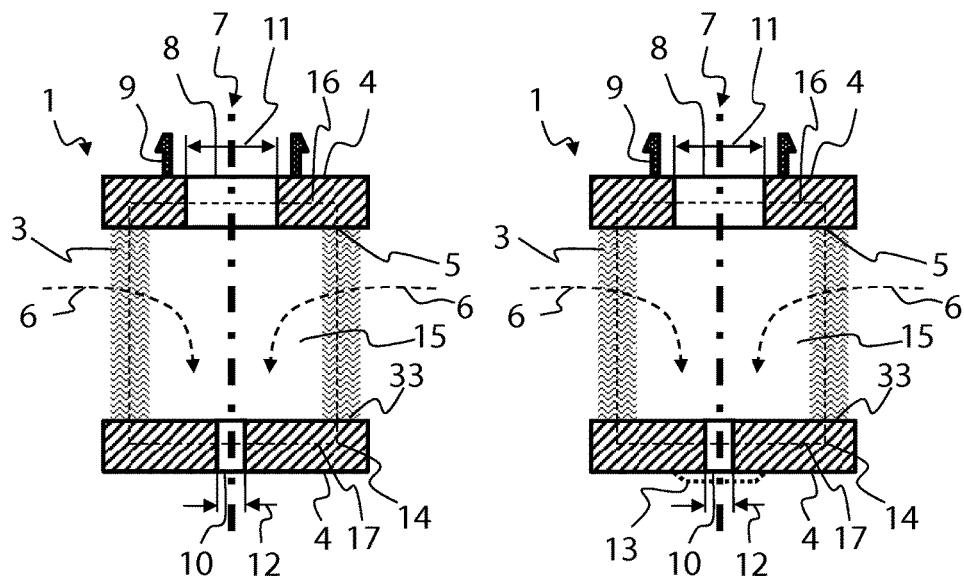
FIG. 1 is a diagrammatic, longitudinal-sectional view of a first structural variant of a filter cartridge.
FIG. 2 is a longitudinal-sectional view of a second structural variant of a filter cartridge.

Referring now to the figures of the drawings in detail and first, particularly, to FIGS. 1, 2, 3, 5 and 6 thereof, there are seen five different structural variants of a filter cartridge 1 according to the invention. The filter cartridge 1 according to FIGS. 1, 2, 3 and 5 in each case has a cylindrical basic shape 14 formed by a filter wall 3. In the case of the filter cartridge 1 of FIG. 6, the basic shape 14 is conical. In this case, the filter wall 3 forms a type of circumferential surface of the basic shape 14. The basic shape 14 is closed off at a top side 16 and at a bottom side 17 in each case by a supporting wall 4. The filter cartridges 1 are preferably in each case approximately rotationally symmetrical with respect to an axis of symmetry 7. The filter wall 3 in each case has an upper edge region 5 and a lower edge region 33. The upper edge region 5 and the lower edge region 33 in each case form an edge of the filter wall 3. There, the filter wall 3 is connected to the supporting walls 4. The supporting walls 4 thus preferably border the filter wall 3. In the individual filter cartridges 1 according to FIGS. 1, 2, 3, 5 and 6, the filter wall 3 and the supporting walls 4 in each case delimit an interior space 15 of the filter cartridge 1.

An outflow opening 8 is provided in the supporting wall 4 at the top side 16. Through the use of the outflow opening 8, the filter cartridge 1 can be connected to a delivery device (such as a pump, for example). The outflow opening 8 is surrounded, in particular, by a coupling device or coupling 9 with which the filter cartridge 1 can be connected in a preferably fluid-tight and detachable manner to a suction opening on a delivery device, in which the suction opening corresponds to the outflow openings 8.

A freezing direction 6 indicated by arrows in FIGS. 1, 2, 3, 5 and 6 in each case shows the direction in which ice can preferably propagate when the reducing agent freezes. Accordingly, ice forms firstly at the filter walls 3 situated at the outside. A (cylindrical, conical, round, etc.) space with liquid reducing agent is therefore formed which is surrounded by an ice layer (ice jacket). In the structural variant according to FIG. 6, the liquid reducing agent space remaining in the interior space 15 is also rather conical. The ice layer subsequently expands in the direction of the center of the interior space 15. The center of the interior space 15 then preferably freezes more quickly at the top side 16 than at the bottom side 17. It can thus be achieved that the ice pressure builds up in the direction of a bypass opening 10 on the bottom side 17.

The bypass opening 10 on the bottom side 17 of the filter cartridge has a different construction in each of the structural variants of the filter cartridge 1 illustrated in FIGS. 1, 2, 3, 5 and 6. Even though in each case (preferably) only a single bypass opening 10 is provided for each filter cartridge 1, it is also possible for a plurality to be provided.

According to FIG. 1, the bypass opening 10 on the bottom side 17 is a single bore with a second diameter 12 which is preferably significantly smaller, in particular ten times smaller than a first diameter 11 of the outflow opening 8.

According to FIG. 2, the bypass opening 10 is likewise formed with a second diameter 12 which is smaller than a first diameter 11 of the outflow opening 8. Furthermore, according to FIG. 2, a screen element or screen 13 is provided which covers the bypass opening 10.

Figure 3:
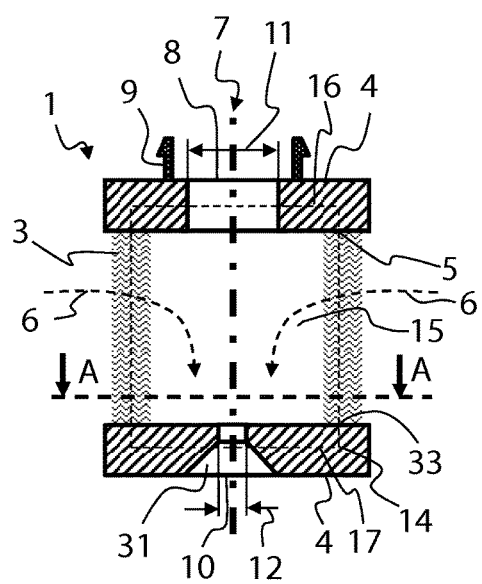
FIG. 3 is a longitudinal-sectional view of a third structural variant of a filter cartridge.

In the structural variant according to FIG. 3, the bypass opening 10 has a shoulder 31. As a result of the shoulder 31, in the bypass opening 10, the supporting wall 14 narrows in a tapering fashion (in sections) towards the interior space. Through the use of such a construction of the bypass opening 10, it is possible for the bypass opening 10 to be produced in a particularly cost-effective and precise manner. This may be realized, for example, by using a hot mandrel which drills through the supporting wall 4 of the filter cartridge 1 in order to produce the bypass opening 10.

Figure 5:
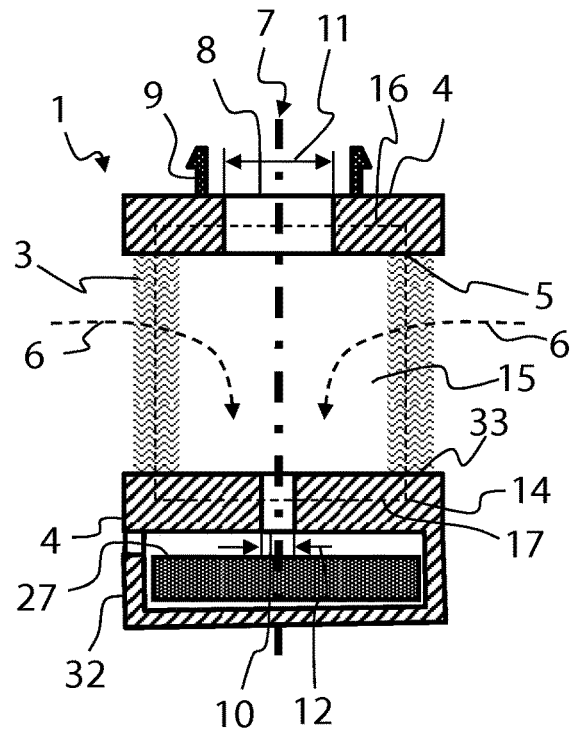
FIG. 5 is a longitudinal-sectional view of a fourth structural variant of a filter cartridge.

In FIG. 5, a bypass opening 10 is likewise formed on the bottom side 17. A compressible insert 27 is held in a receptacle 32 which is provided opposite the bypass opening 10 at the outside on the bottom side 17.

Ice pressure which builds up in the interior space 15 of the filter cartridge 1 and which is dissipated through the bypass opening 10 can be discharged into the compressible insert 27.

Figure 6:
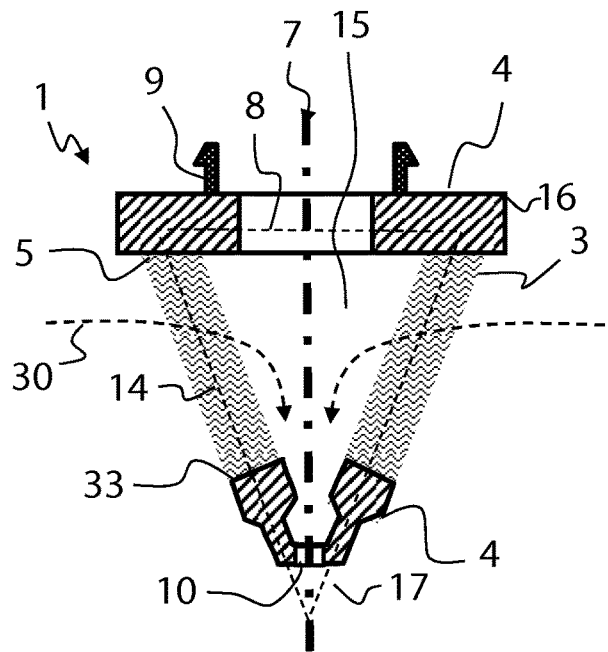
FIG. 6 is a longitudinal-sectional view of a fifth structural variant of a filter cartridge.

In FIG. 6, the bypass opening 10 is constructed correspondingly to FIG. 1. FIG. 6 merely illustrates the conical shape of the filter cartridge 1 in contrast to FIG. 1.

The particular different structures and features of the structural variants of the filter cartridge 1 according to FIGS. 1, 2, 3, 5 and 6 may be combined with one another in any desired way.

Figure 4:
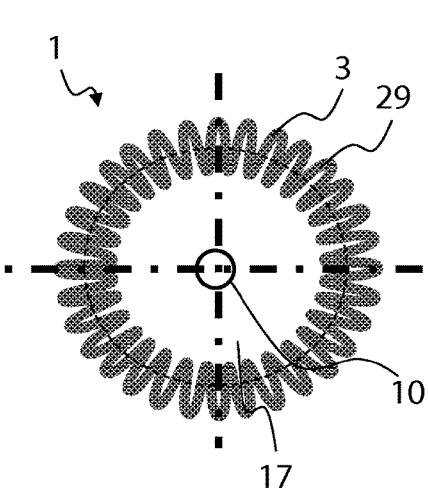
FIG. 4 is a cross-sectional view of a filter cartridge.

FIG. 4 shows a section through an embodiment of the filter cartridge 1 taken along a section line A-A of FIG. 3, in the direction of the arrows. FIG. 4 thus shows the filter wall 3 of the filter cartridge 1. In this case, the filter wall 3 has a corrugated structure 29. Through the use of such a corrugated structure 29, it is possible for a particularly large filter surface area of the filter wall 3 to be realized with a simultaneously relatively small spatial requirement for the filter cartridge 1. It is also possible to see the bottom side 17 of the filter cartridge 1, as viewed along the axis of symmetry 7 in FIG. 4. It is possible to see the supporting wall 4 with the bypass opening 10 on the bottom side 17.

Figure 7:
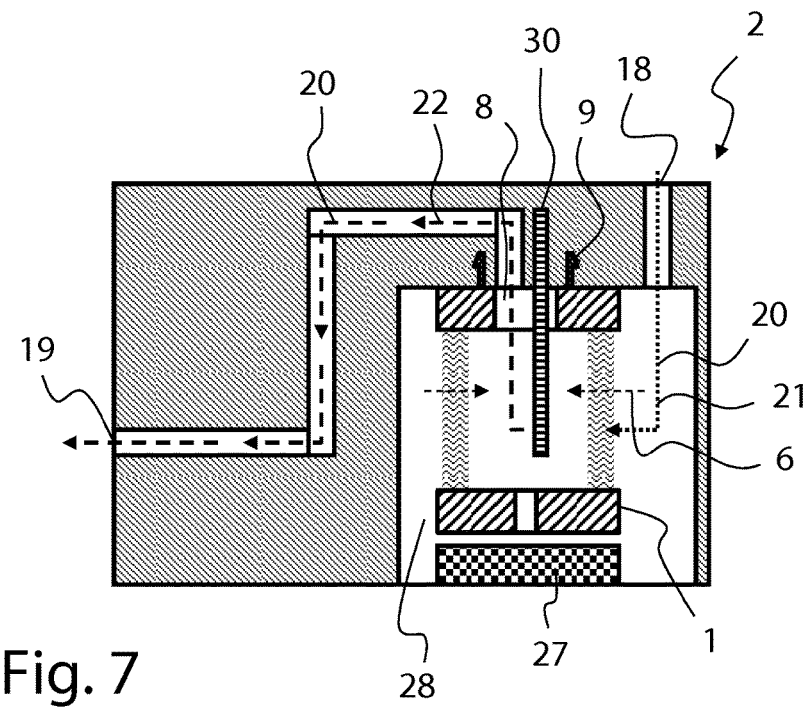
FIG. 7 is a longitudinal-sectional view of a delivery device.

FIG. 7 illustrates a structural variant of a delivery device 2 into which a filter cartridge 1 according to the invention has been inserted. The filter cartridge 1 has been inserted into a cartridge receptacle 28 provided in the delivery device 2. There is a delivery path 20 through the delivery device 2 from a suction point 18 to a discharge point 19. The delivery path 20 is divided by the filter cartridge 1 or by the filter wall 3 of the filter cartridge 1 into a first path section 21 from the suction point 18 to the filter wall 3 and a second path section 22 from the filter wall 3 to the discharge point 19. An ice pressure which builds up in the interior space 15 of the filter cartridge 1 can be dissipated through the bypass opening 10 of the filter cartridge 1 to the outside or into the cartridge receptacle 28. A compressible insert 27 is provided in the cartridge receptacle 28. It is possible for the compressible insert 27 to be a constituent part of the filter cartridge 1, wherein in this regard, reference is made, in particular, to FIG. 5 and the explanations relating thereto. It is, however, likewise possible for the compressible insert 27 to be placed, as a separate component, into the delivery device 2 or into the cartridge receptacle 28. The filter cartridge 1 is connected to the delivery device 2 through an outflow opening 8 and a coupling device 9. It is additionally shown in FIG. 7 that a heating device or heater 30 of the delivery device 2 extends into the interior space 15 of the filter cartridge 1 through the outflow opening 8. The heating device 30 may at the same time also be a heat-conducting structure which, in a shut-down situation, when the heating device 30 is not operated, dissipates heat from the interior space 15. Since the heating device 30 projects into the filter cartridge 1 from above, it can be ensured that the interior space 15 freezes starting from the top, and the ice pressure is built up lastly in the direction of the bypass opening 10. FIG. 7 also shows the freezing direction 6 in which the formation of ice can take place in the delivery device 2 in the region of the filter cartridge 1.

Figure 8:
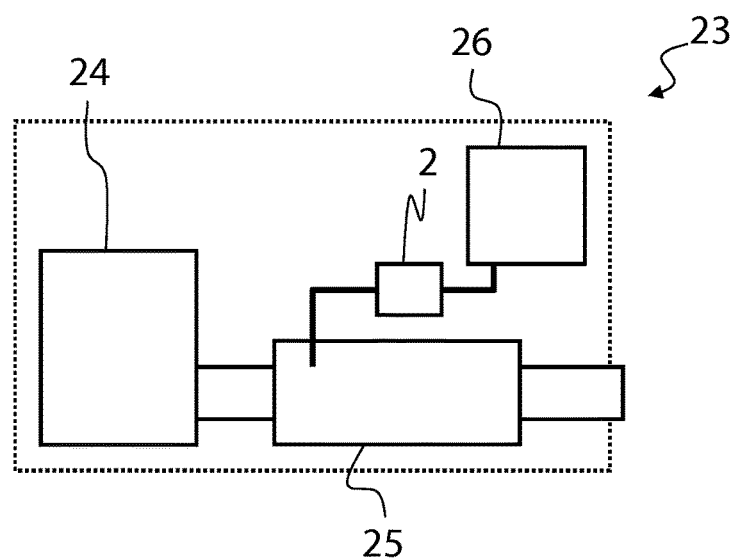
FIG. 8 is a block diagram of a motor vehicle having a delivery device.

FIG. 8 shows a motor vehicle 23 having an internal combustion engine 24 and an exhaust-gas treatment device 25 for the purification of the exhaust gases of the internal combustion engine 24. Reducing agent can be delivered into the exhaust-gas treatment device 25 from a tank 26 by using a delivery device 2. An SCR catalytic converter, for example, may then be provided in the exhaust-gas treatment device. The SCR catalytic converter realizes a conversion of the exhaust gas according to the SCR method.

The invention claimed is:

1. A filter cartridge for a delivery device for a reducing agent, the filter cartridge comprising:
at least one filter wall and at least one supporting wall together forming an interior space receiving reducing agent filtered by said at least one filter wall;
said at least one supporting wall having an outflow opening discharging the filtered reducing agent out of said interior space and a bypass opening discharging the filtered reducing agent out of said interior space when a predefined excess pressure prevails in said interior space;
said outflow opening having a first diameter and said bypass opening having a second diameter being less than one tenth of said first diameter;
said outflow opening configured to be coupled to the delivery device and said bypass opening bypassing said outflow opening.

2. The filter cartridge according to claim 1, which further comprises a screen element covering said bypass opening.

3. The filter cartridge according to claim 2, wherein said screen element is welded or vulcanized to said at least one supporting wall.

4. The filter cartridge according to claim 1, wherein said bypass opening has a diameter of at least 100 μm [micrometers].

5. The filter cartridge according to claim 1, wherein:
said filter wall has a cylindrical basic shape;
said at least one supporting wall includes two supporting walls each forming a respective one of a top side and a bottom side; and
said outflow opening is disposed at said top side and said bypass opening is disposed at said bottom side.

6. The filter cartridge according to claim 1, wherein said supporting wall has a receptacle, and a compressible insert is disposed in said receptacle.

7. A delivery device for a reducing agent, the delivery device comprising:
at least one filter cartridge according to claim 1; and
a suction point and a discharge point defining a delivery path for the reducing agent from said suction point to said discharge point;
said delivery path running through said at least one filter cartridge.

8. A motor vehicle, comprising:
an internal combustion engine;
an exhaust-gas treatment device for purification of exhaust gases of said internal combustion engine; and
a delivery device for delivering reducing agent into said exhaust-gas treatment device, said delivery device including:
at least one filter cartridge according to claim 1, and
a suction point and a discharge point defining a delivery path for the reducing agent from said suction point to said discharge point,
said delivery path running through said at least one filter cartridge.

9. The filter cartridge according to claim 1, wherein the predefined excess pressure prevailing in said interior space is caused by reducing agent freezing in said interior space.

10. A filter cartridge for a delivery device for a reducing agent, the filter cartridge comprising:
at least one filter wall and at least one supporting wall together forming an interior space receiving reducing agent filtered by said at least one filter wall;
said at least one supporting wall having an outflow opening discharging the filtered reducing agent out of said interior space and an always open bypass opening discharging the filtered reducing agent out of said interior space when a predefined excess pressure prevails in said interior space, said bypass opening being smaller than said outflow opening, said bypass opening having a screen spanning said bypass opening for preventing impurities from entering said interior space through said bypass opening;

said outflow opening configured to be coupled to the delivery device and said bypass opening bypassing said outflow opening.

11. The filter cartridge according to claim 10, wherein said outflow opening has a first diameter and said bypass opening has a second diameter that is less than one tenth of said first diameter.

12. The filter cartridge according to claim 1, wherein said bypass opening is always open.

13. The filter cartridge according to claim 1, wherein said supporting wall has a receptacle, and a compressible insert is disposed in said receptacle, said compressible insert dissipates ice pressure of the reducing agent by the reducing agent acting directly upon the said compressible insert.

14. The filter cartridge according to claim 1, wherein said supporting wall has a receptacle, and a compressible insert is disposed in said receptacle, said compressible insert being rubber or a compressible bellows.

* * * * *